United States Patent [19]

Hunter

[11] 4,029,044

[45] June 14, 1977

[54] DEVICE FOR SENSING UNDRIED TIRE CORD FABRIC TREATED WITH A BONDING AGENT

[75] Inventor: Edward E. Hunter, Akron, Ohio

[73] Assignee: The Goodyear Tire & Rubber Company, Akron, Ohio

[22] Filed: Sept. 17, 1975

[21] Appl. No.: 614,725

[52] U.S. Cl. .................................. 118/9; 118/122; 73/73

[51] Int. Cl.² ..................................... B05C 11/04

[58] Field of Search ................ 73/29, 73; 118/9, 7, 118/8, 122, 50; 34/43, 55; 162/263

[56] References Cited

UNITED STATES PATENTS

| | | | |
|---|---|---|---|
| 3,253,315 | 5/1966 | Eicken | 73/73 X |
| 3,618,368 | 11/1971 | Lesemann | 73/73 |
| 3,675,621 | 7/1972 | Griffin et al. | 118/122 |
| 3,713,966 | 1/1973 | Lippke | 73/73 X |
| 3,731,520 | 5/1973 | Hickman et al. | 73/73 |
| 3,738,018 | 6/1973 | Herzhoff et al. | 118/50 X |
| 3,942,696 | 3/1976 | Pira et al. | 226/21 |

Primary Examiner—John P. McIntosh
Attorney, Agent, or Firm—F. W. Brunner; H. E. Hummer

[57] ABSTRACT

A device for sensing wet tire cord fabric treated with a liquid bonding agent carried by a vaporizable solvent. The device is characterized by a chamber in which solvent vapor is accumulated. The chamber is formed between a pair of rotatable metal rolls which engage fabric moving past them. A conventional gas analyzer is coupled to the chamber for drawing fluid from the chamber and making an analysis of the fluid to determine if the fabric is still wet and has not been sufficiently dried.

8 Claims, 2 Drawing Figures

DEVICE FOR SENSING UNDRIED TIRE CORD FABRIC TREATED WITH A BONDING AGENT

BACKGROUND OF THE INVENTION

The invention is particularly well suited for sensing wet fabric that has supposedly been dried, and especially fabric where a highly combustible vapor accompanies the wet fabric. A good use of the invention is in the continual monitoring of a continuous sheet of plain woven tire cord fabric which has been treated with a bonding agent that is carried by a combustible vaporizable solvent which is removed as the fabric is dried. In such cases, combustible vapors accompany the wet fabric and must be removed prior to further treatment of the fabric. The detection of such vapor has been very difficult in the past, because of the small quantity of vapor given off be a wet fabric. The invention is directed to solving this problem by providing adjacent the moving fabric, a chamber in which a sufficient amount of vapor or fluid can be accumulated to become detectable.

Briefly stated, the invention is in a device for sensing wetness of supposedly dry fabric treated with a vaporizable solvent carrier and coating agent. The apparatus comprises a pair of parallel, elongated idler rolls for contacting a moving fabric in spaced relation, the rolls being rotated by the moving fabric. Means are provided for forming a chamber, adjacent the fabric and at least between the rolls, in which vapor from wet fabric can accumulate. Other means are supplied for drawing fluid from this chamber and analyzing it to determine if the fabric is too wet and has not sufficiently dried.

DESCRIPTION OF THE DRAWING

The following description of the invention will be better understood by having reference to the drawing, wherein.

THE INVENTION

Figure 1:
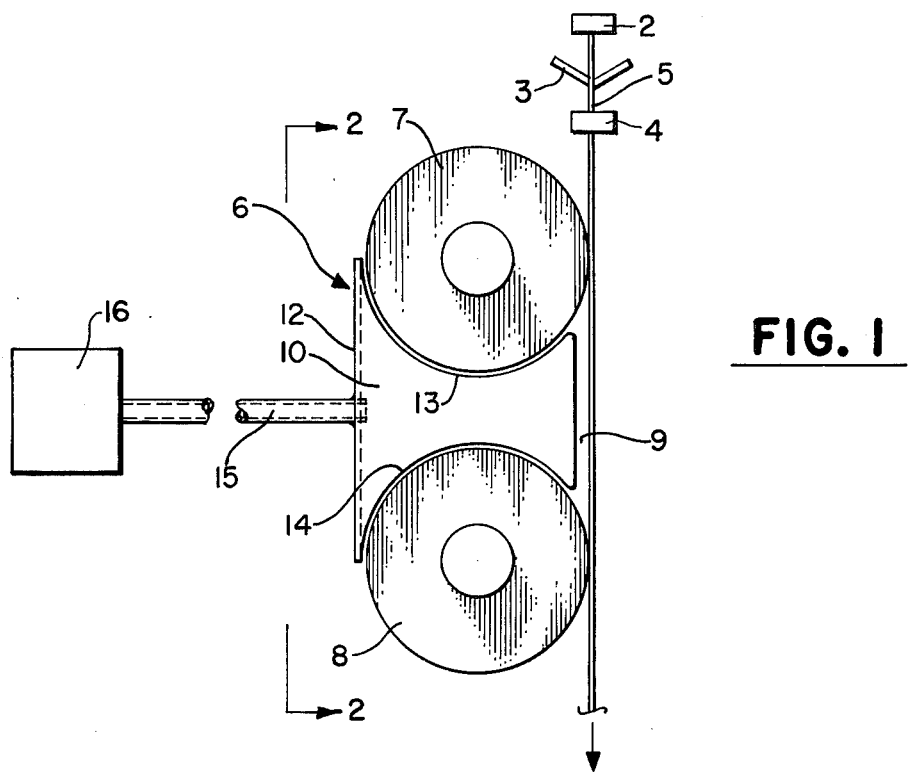
FIG. 1 is a side view of a fluid accumulating chamber of a sensing device made in accordance with the invention.

With reference to the drawing, there is shown a plain woven tire cord fabric 5 which is moved by a conventional pull roll assembly, as best described in U.S. Pat. No. 3,517,425, past an apparatus 6 designed to detect wetness of the fabric 5 and determine if the fabric 5 has been sufficiently dried. Prior to this, the tire cord fabric 5 has been dipped in a liquid bonding agent and vaporizable solvent carrier of the agent at a point indicated at 2 in FIG. 1. The coated wet fabric 5 is then passed through a pair of adjustable scraper blades 3, as best described in U.S. Pat. No. 3,675,621, for removing excess liquid coating from the fabric. The coated fabric 5 is next passed through an oven 4 where it is heated to remove the solvent carrier and dry the bonding agent on the fabric. Immediately upon leaving the oven, the tire cord fabric 5 is analyzed for wetness and accompanying vapors which are highly combustible and could provide a dangerous condition if the wet fabric is further treated in an environment conducive to causing combustion of the vapors accompanying the wet fabric.

The sensing apparatus or device 6 comprises a pair of parallel, elongated idler rolls 7 and 8 which are freely mounted for rotation about their longitudinal axes that parallel the moving tire cord fabric 5 and are spaced from the fabric 5 a distance such that the idler rolls 7 and 8 contact the moving fabric 5 and are rotated thereby. The cylindrical surfaces of the idler rolls 7 and 8 contacting the tire cord fabric 5 are metallic, being preferably chrome-plated.

Figure 2:
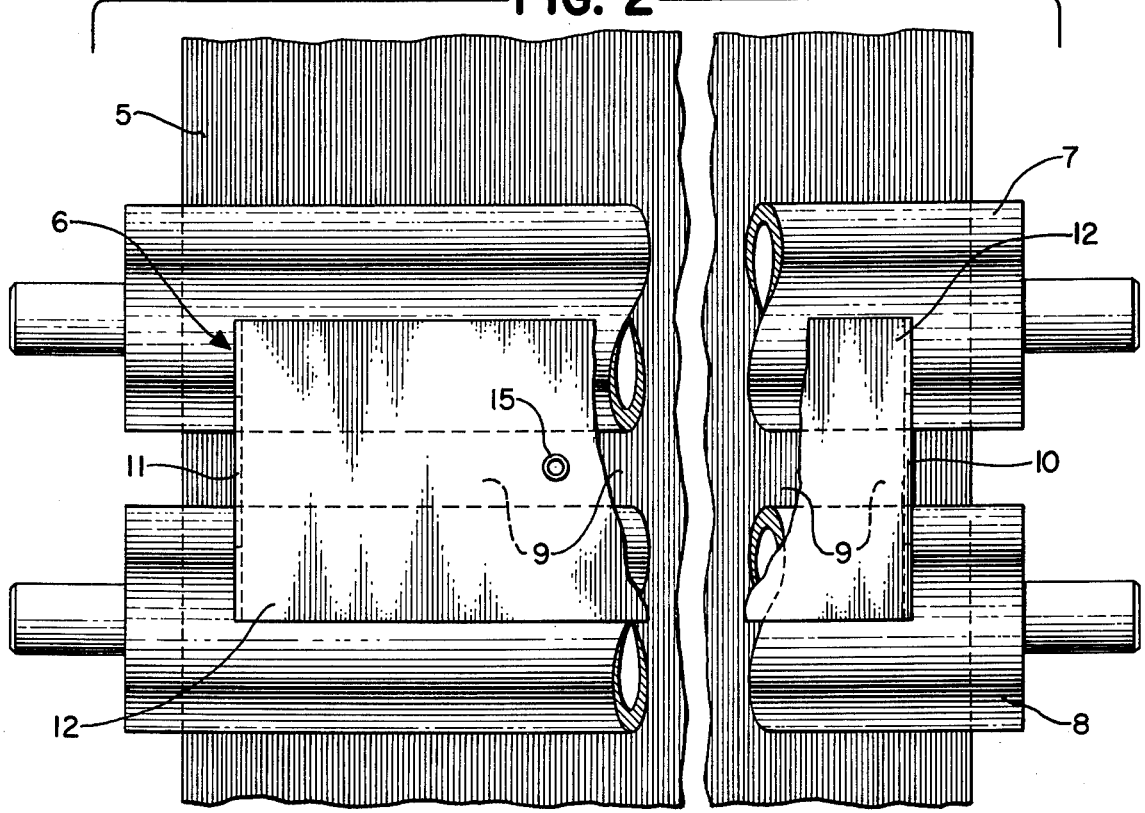
FIG. 2 is a plan view from the line 2—2 of FIG. 1 of the chamber in relation to a sheet of fabric moving past the chamber.

A chamber 9, in which solvent vapor can accumulate, is formed adjacent the moving fabric 5 at least between the idler rolls 7 and 8 which, as best seen in FIG. 2, extend beyond the chamber 9. The chamber 9 is formed between the moving cord fabric 5, the rolls 7 and 8, a pair of partition walls 10, 11 spaced between the idler rolls 7 and 8, and a cover plate 12 secured to the edges of the partition walls farthest from the moving fabric 5 for covering the chamber 9. The partition walls 10 and 11 each have opposing edges 13 and 14 which are oppositely curved and matingly configured to the cylindrical shape of the idler rolls 7 and 8, as best seen in FIG. 1. The partition walls 10 and 11 are spaced slightly from the chrome-plated idler rolls 7 and 8 and the moving fabric 5.

A hollow tube 15 is secured to the cover plate 12 in communication with the accumulating chamber 9 such that fluid can be withdrawn from the chamber 9 for circulation to a conventional gas analyzer 16 of any suitable design, where the amount of fluid is translated into a determination whether the fabric is dry or sufficiently wet to require some corrective action. The sensing device 6 can be wired to stop movement of the fabric 5, or actuate an alarm system to notify an operator that the fabric 5 is too wet such that the prior operations of coating and drying the fabric can be stopped or adjusted. Generally, it has been found easier to change the position of the scraper blades to more compressively engage the fabric 5 and remove more excess liquid coating, rather than adjusting the actual drying of the fabric.

Thus, there has been described a device for determining the wetness of fabric and accompanying combustible vapors which can prove explosive under certain conditions to which the fabric might be further exposed. The idler rolls engage the fabric and, when wetted, act to bring more vapor into the chamber along with the moving fabric, whereby a sufficient amount of vapor is accumulated for detection by conventional fluid detection devices, such as a single point, continuous combustible gas analyzer capable of circulating, for example, 1500 cubic centimeters of gas per minute.

What is claimed is:

1. An apparatus for sensing wetness of supposedly dry fabric treated with a vaporizable solvent carrier and coating agent, comprising:

a. a pair of parallel, elongated idler rolls for contacting a moving, supposedly dry fabric and carrying vapor from the fabric into a chamber in which the vapor accumulates;

aa. means for mounting the idler rolls for contacting the same side of the fabric and for rotating freely about axes which are parallel to the moving fabric and transverse to the direction in which the fabric moves past the idler rolls;

b. means for forming adjacent the fabric a confined chamber, in which vapor from wet fabric can accumulate, the chamber designed to at least partially include the idler rolls; and c. means for drawing from the chamber, vapor accumulating therein, said means including a conduit for carrying vapor away from the chamber; and cc. gas analyzer means connected to the conduit for detecting vapor drawn from the chamber.

2. The apparatus of claim 1, wherein the chamber-forming means includes:

d. a pair of partition walls disposed in spaced relation between the idler rolls, each of the walls including oppositely curved semi-circular edges configured to match the cylindrical shape of the idler rolls, the walls being closely spaced to the idler rolls and moving fabric; and e. a cover plate secured to the edges of the partition walls farthest from the moving fabric and covering the chamber formed by the partition walls, idler rolls, moving fabric, and cover plate.

3. The apparatus of claim 2, wherein the cylindrical surface of each idler roll contacting the fabric, is metallic.

4. An apparatus for sensing wetness of supposedly dry fabric treated with a vaporizable solvent carrier and coating agent, comprising:

a. a confined chamber with an opening through which vapor can enter and accumulate in the chamber;

b. means for guiding a supposedly dry fabric past the opening of the chamber;

c. at least one idler roll for carrying vapor from the fabric into the chamber;

d. means for mounting the roll for contacting the fabric moving past the chamber and for rotating freely about an axis which is parallel to the moving fabric and transverse to the direction in which the fabric moves past the roll;

e. means for positioning the roll for carrying vapor from the fabric through the opening of the chamber for accumulation in the chamber; and f. means for drawing from the chamber, vapor accumulating therein, said means including a conduit for carrying vapor away from the chamber; and ff. gas analyzer means connected to the conduit for detecting vapor drawn from the chamber.

5. The device of claim 4, wherein the chamber includes:

g. a second idler roll spaced from said at least one roll and contacting the same side of the fabric as said at least one roll, the second roll being mounted for rotating freely about an axis which parallels the rotational axis of said at least one roll;

h. a pair of partition walls disposed in spaced relation between the idler rolls, each of the walls including oppositely curved semi-circular edges configured to match the cylindrical shape of the idler rolls, the walls being closely spaced to the idler rolls and moving fabric; and i. a cover plate secured to the edges of the partition walls farthest from the moving fabric and covering the chamber formed by the partition walls, idler rolls, moving fabric, and cover plate.

6. The device of claim 5 including in sequence, means for coating the fabric with a liquid;

means for removing excess liquid coating from the fabric; and means for drying the fabric;

said coating means, removing means, and drying means being located upsteam of the wetness testing structure with respect to the direction of fabric travel.

7. The device of claim 6, wherein the means for removing excessive liquid coating from the fabric includes a pair of scraper blades for compressively engaging fabric moving therebetween.

8. The device of claim 7, which includes means associated with the apparatus for adjusting the position of the scraper blades when the gas analyzer indicates the fabric is not sufficiently dried.

* * * * *